United States Patent
Warnez

(10) Patent No.: US 11,769,142 B2
(45) Date of Patent: Sep. 26, 2023

(54) METHOD FOR PROVIDING A DIGITAL REPRESENTATION OF A TRANSACTION CARD IN A MOBILE DEVICE

(71) Applicant: NXP B.V., Eindhoven (NL)

(72) Inventor: Dimitri Warnez, Hamburg (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/828,275

(22) Filed: Mar. 24, 2020

(65) Prior Publication Data
US 2020/0320510 A1    Oct. 8, 2020

(30) Foreign Application Priority Data

Apr. 3, 2019 (EP) .................................... 19167155

(51) Int. Cl.
| | |
|---|---|
| *H04W 4/80* | (2018.01) |
| *G06Q 50/30* | (2012.01) |
| *G06Q 20/34* | (2012.01) |
| *G06Q 20/32* | (2012.01) |

(52) U.S. Cl.
CPC ....... *G06Q 20/354* (2013.01); *G06Q 20/3227* (2013.01); *G06Q 20/3278* (2013.01); *H04W 4/80* (2018.02); *G06Q 50/30* (2013.01); *G06Q 2240/00* (2013.01)

(58) Field of Classification Search
CPC ............. G06Q 20/354; G06Q 20/3227; G06Q 20/3278; G06Q 50/30; G06Q 2240/00; H04W 4/80
USPC .......................................................... 705/41
See application file for complete search history.

(56) References Cited

U.S. PATENT DOCUMENTS

| | | | |
|---|---|---|---|
| 7,289,790 B2 | 10/2007 | McCorkle et al. | |
| 8,693,655 B1 * | 4/2014 | Chau ..................... | H04M 17/10 379/201.11 |
| 8,763,896 B2 * | 7/2014 | Kushevsky ........ | G06Q 30/0601 235/382 |
| 9,585,006 B2 | 2/2017 | Qian et al. | |

(Continued)

OTHER PUBLICATIONS

Konsko, Lindsay; "Credit Card Canceled Due to Inactivity? This Is What You Need to Know;" Nerdwallet; Jan. 16, 2018; https://www.nerdwallet.com/blog/credit-cards/credit-card-cancelled-due-inactivity/.

*Primary Examiner* — Bennett M Sigmond
*Assistant Examiner* — Michael J Warden

(57) ABSTRACT

In accordance with a first aspect of the present disclosure, a method is conceived for providing a digital representation of a transaction card in a mobile device, comprising: detecting, by a near field communication unit of said mobile device, that the transaction card is in proximity of the mobile device; upon or after said detecting, performing, by a processing unit of said mobile device, the following steps: retrieving the digital representation of the transaction card from a digitization server; loading the digital representation of the transaction card into a memory of the mobile device; activating the digital representation of the transaction card for a predefined validity period; invalidating the digital representation of the transaction card if no successful near field communication transaction has been performed within said validity period. In accordance with other aspects of the present disclosure, a corresponding computer program and a corresponding mobile device are provided.

19 Claims, 3 Drawing Sheets

(56) References Cited

U.S. PATENT DOCUMENTS

| | | | |
|---|---|---|---|
| 2006/0085340 A1* | 4/2006 | Hung | G06Q 20/10 |
| | | | 705/42 |
| 2009/0276341 A1* | 11/2009 | McMahan | G06Q 40/12 |
| | | | 235/375 |
| 2010/0005026 A1* | 1/2010 | Waldman | G06Q 10/10 |
| | | | 705/1.1 |
| 2016/0063484 A1* | 3/2016 | Carpenter | G06Q 20/354 |
| | | | 705/41 |
| 2016/0381010 A1* | 12/2016 | Bhandari | H04L 63/0435 |
| | | | 713/171 |
| 2017/0111352 A1* | 4/2017 | Schmaholz | H04L 67/01 |
| 2018/0278595 A1* | 9/2018 | Zhang | H04W 12/0471 |
| 2019/0164384 A1* | 5/2019 | Soukup | G07F 17/3239 |
| 2020/0320510 A1* | 10/2020 | Warnez | G06Q 20/3552 |
| 2021/0125164 A1* | 4/2021 | Mehrhoff | G06Q 20/20 |

* cited by examiner

METHOD FOR PROVIDING A DIGITAL REPRESENTATION OF A TRANSACTION CARD IN A MOBILE DEVICE

CROSS-REFERENCE TO RELATED APPLICATIONS

This application claims priority under 35 U.S.C. § 119 to European Patent Application No. 19167155.1, filed on Apr. 3, 2019, the contents of which are incorporated by reference herein.

TECHNICAL FIELD

The present disclosure relates to a method for providing a digital representation of a transaction card in a mobile device. Furthermore, the present disclosure relates to a corresponding computer program and to a corresponding mobile device.

BACKGROUND

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are loaded into the mobile devices.

SUMMARY

In accordance with a first aspect of the present disclosure, a method is conceived for providing a digital representation of a transaction card in a mobile device, comprising: detecting, by a near field communication unit of said mobile device, that the transaction card is in proximity of the mobile device; upon or after said detecting, performing, by a processing unit of said mobile device, the following steps: retrieving the digital representation of the transaction card from a digitization server; loading the digital representation of the transaction card into a memory of the mobile device; activating the digital representation of the transaction card for a predefined validity period; invalidating the digital representation of the transaction card if no successful near field communication transaction has been performed within said validity period.

In an embodiment, invalidating the digital representation of the transaction card comprises deactivating the digital representation of the transaction card.

In an embodiment, invalidating the digital representation of the transaction card comprises removing the digital representation of the transaction card from the memory. In an embodiment, the digital representation includes data indicative of said validity period.

In an embodiment, retrieving the digital representation of the transaction card from the digitization server is performed through a further communication unit of the mobile device.

In an embodiment, the further communication unit is a cellular communication unit or a Wi-Fi communication unit.

In an embodiment, the memory is included in a secure element of the mobile device.

In an embodiment, the processing unit is included in said secure element.

In an embodiment, the digital representation of the transaction card is retrieved through a secure channel established between the secure element and the digitization server.

In an embodiment, the transaction card is an access card, a transit card or a payment card.

In accordance with a second aspect of the present disclosure, a computer program is provided, comprising executable instructions that, when executed, carry out the method of any preceding claim.

In accordance with a third aspect of the present disclosure, a mobile device is provided, comprising a near field communication unit and a processing unit, wherein the near field communication unit is configured to detect that a transaction card is in proximity of the mobile device, and wherein the processing unit is configured to: retrieve a digital representation of the transaction card from a digitization server; load the digital representation of the transaction card into a memory of the mobile device; activate the digital representation of the transaction card for a predefined validity period; invalidate the digital representation of the transaction card if no successful near field communication transaction has been performed within said validity period.

In an embodiment, the processing unit is configured to invalidate the digital representation of the transaction card by deactivating the digital representation of the transaction card.

In an embodiment, the processing unit is configured to invalidate the digital representation of the transaction card by removing the digital representation of the transaction card from the memory.

In an embodiment, the mobile device is a mobile phone.

DESCRIPTION OF DRAWINGS

Embodiments will be described in more detail with reference to the appended drawings, in which.

DESCRIPTION OF EMBODIMENTS

Figure 1:
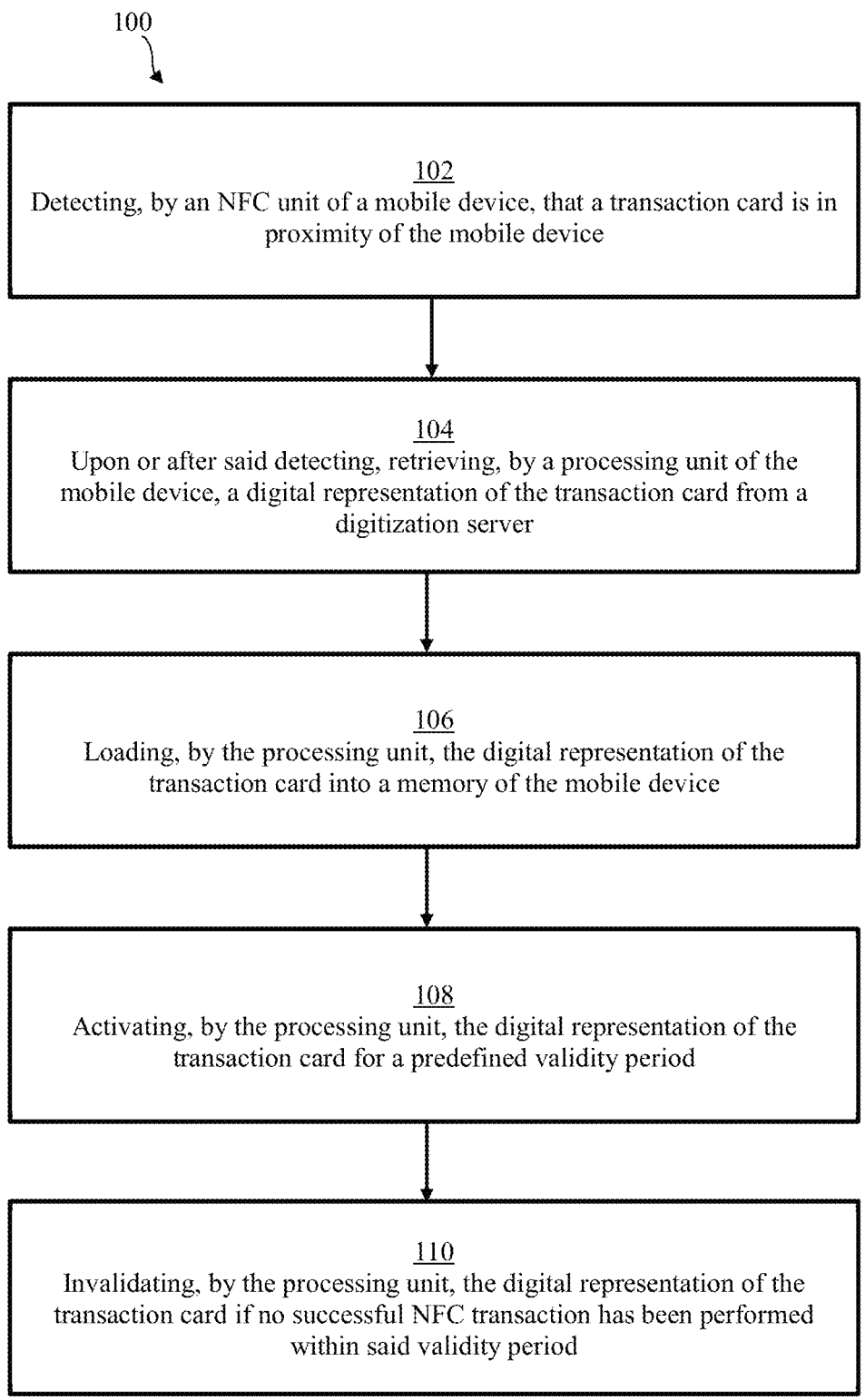
FIG. 1 shows an illustrative embodiment of a method for providing a digital representation of a transaction card in a mobile device.

Near field communication (NFC) refers to a set of communication protocols that enable two electronic devices to establish communication by bringing them within proximity of each other. The communication range of NFC is typically in the order of centimeters (e.g., 10 centimeters or less). NFC technology can be used to carry out various transactions, such as transactions for accessing buildings, transactions for accessing public transportation sites or vehicles, and payment transactions. For these purposes, physical NFC-enabled transaction cards are often used. Such transaction cards are often referred to as smart cards. Accordingly, different types of transaction cards exist, such as access cards, transit cards and payment cards. Nowadays, NFC-enabled mobile devices such as smart phones may be used to carry out similar transactions. For this purpose, digital representations of physical transaction cards are loaded into the mobile devices.

However, the market for e.g. contactless, plastic access control cards is very fragmented with many small service providers and system integrators of many potentially small infrastructures (e.g. residential buildings). This makes it difficult to make NFC-based mobile, digitized versions of these plastic cards. The card issuer might be able to hand over some keys (e.g. master keys) to a digitization service, but other information, such as card data, or an exact mapping of who exactly is the right owner of a card, might not always be available in the digitization service back-end. For instance, in an infrastructure where 10 users have a card to access the garage of an apartment building, the service provider might not be able or willing to give the names of the 10 users upfront to the digitization service and might not be set up for real-time connection. This means that in the actual enrolment process of the digitization process, strong risk management will be needed, combining risk limiting procedures. In particular, the loading of digital versions of contactless cards (e.g. for access control) into NFC phones, needs risk management procedures as the back-end does not always have the capability to perform all needed verifications. One possible abuse is that a card is downloaded into other people's phones while the card owner does not notice this.

In an example, the following steps are performed to make a mobile version of a contactless (access control) card:
- a user brings the card in proximity of the NFC reader of his phone;
- a communication session is started between the digitization service back-end, implemented on a digitization server, and the card through a computer program (a so-called "app");
- the back-end performs some checks and prepares data to be downloaded to the phone;
- the data are downloaded to the phone;
- a digital version of the card is available as a so-called "NFC card" on the phone.

However, by the nature of contactless cards, it is possible to communicate with them without involvement of the owner, e.g. by holding a contactless reader to the owner's pocket, which contains the contactless card. This means that in this case, attackers might try to digitize the contactless card of a victim "on the go", by holding their phone to the contactless card and requesting a digital copy from the digitization back-end. Evidently, this presents a security risk. Now discussed are methods, computer programs and devices that mitigate this security risk.

FIG. 1 shows an illustrative embodiment of a method 100 for providing a digital representation of a transaction card in a mobile device. The method 100 comprises the following steps. At 102, it is detected, by an NFC unit of a mobile device, that a transaction card is in proximity of the mobile device. At 104, upon or after said detection, a processing unit of the mobile device retrieves a digital representation of the transaction card from a digitization server. At 106, the processing unit loads the digital representation of the transaction card into a memory of the mobile device. At 108, the processing unit activates the digital representation of the transaction card for a predefined validity period (for example using a timer). The activation can be done explicitly, e.g. by setting a flag indicative of an active status of the digital representation—which flag can be read by an application that processes a given transaction—or implicitly, e.g. by simply making the digital representation available in an accessible part of the memory. At 110, the processing unit invalidates the digital representation of the transaction card if no successful NFC transaction has been performed within said validity period (for example, if no successful NFC transaction is performed before the timer expires).

Thus, a test is implemented, which involves carrying out an NFC transaction with a reader to confirm that a valid user has initiated the download of a digital representation of the transaction card. In this way, the security risk is reduced. More specifically, one way to reduce this risk, is by introducing the request for a proof of a local transaction. This will improve the probability that the contactless card can only be downloaded in a phone by a person who is standing close to a reader belonging to that card. The disclosed method can be used as part of, or in conjunction with, risk management procedures for contactless card digitization. Upon digitization of the card, the following steps may be performed:

1. The server downloads to the phone a temporary digitized card. The digitized card is given a time-limited validity (e.g. 30 seconds).
2. If during the validity period of the temporary digitized card, no successful transaction is performed with the phone on a reader (using that digitized card), the digitized card is automatically invalidated.
3. If during the validity period of the temporary digitized card, a successful transaction is performed with the phone on a reader (using that digitized card), the digitized card automatically becomes a permanent one.

Referring to the previous example, in this way, it is prevented that cards are digitized somewhere on the go, as it will not be possible to perform an NFC transaction quickly enough to make the card permanent. It is noted that this mechanism could be used in conjunction with other measures in a risk management process, such as determining the location of the requester by means of the global positioning system (GPS).

In an embodiment, invalidating the digital representation of the transaction card comprises deactivating the digital representation of the transaction card. Depending on how the digital representation was activated, the deactivation may be performed in different ways, e.g. by changing the value of a flag or by moving the digital representation to a protected or inaccessible part of the memory. In this way, the digital representation can easily be invalidated. In another embodiment, invalidating the digital representation of the transaction card comprises removing the digital representation of the transaction card from the memory. In this way, it is ensured that the digital representation can no longer be used, which results in a higher level of security. However, in that case, a new attempt to load the digital representation into the mobile device requires a new download of the digital representation from the digitization server.

In an embodiment, the digital representation includes data indicative of said validity period. In other words, the digital representation retrieved from the digitization server contains the information about the validity period of the digital representation (e.g. 30 seconds). This results in a practical and effective implementation of a temporary digitized card. In other implementations, the data indicative of the validity period may be provided separately to the processing unit of the mobile device. For example, the validity period may be a parameter of the implementation itself, e.g. any digital representation that is loaded is only valid for an amount of time indicated by the value of said parameter. In another example, an additional step may be added to load the validity period.

In an embodiment, retrieving the digital representation of the transaction card from the digitization server is performed through a further communication unit of the mobile device. This facilitates retrieving the digital representation. In a practical and effective implementation, the further communication unit is a cellular communication unit or a communication unit that enables a connection to the internet, such as a Wi-Fi communication unit.

In an embodiment, the memory is included in a secure element of the mobile device. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. In this way, the digital representation of the transaction card is stored in a protected environment. Furthermore, in an embodiment, the processing unit is included in the secure element. In this way, the processing of the digital representation of the transaction card is also carried out in a protected environment, which further increases the level of security. To further increase the level of security, the digital representation of the transaction card may be retrieved through a secure channel established between the secure element and the digitization server. Such a secure channel may for example be established by generating and using cryptographic session keys for encrypting and decrypting data to be communicated between the secure element and the digitization server.

Figure 2:
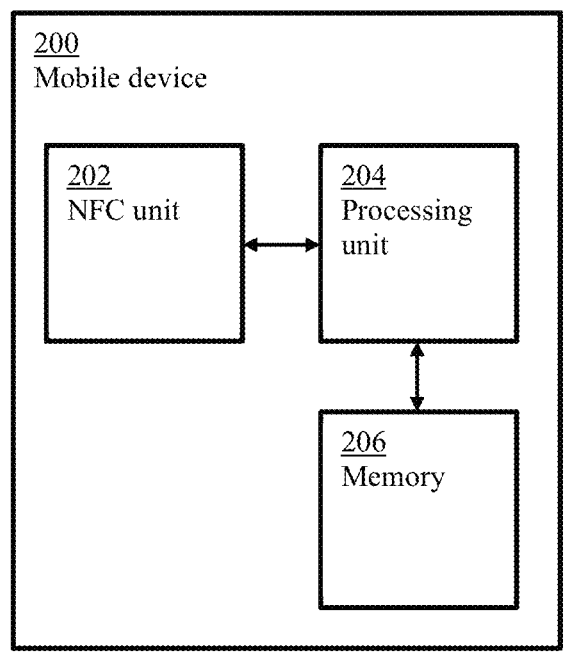
FIG. 2 shows an illustrative embodiment of a mobile device.

FIG. 2 shows an illustrative embodiment of a mobile device 200. The mobile device 200 comprises an NFC unit 202. Furthermore, the mobile device 200 comprises a processing unit 204 operatively coupled to the NFC unit 202. Furthermore, the mobile device 200 comprises a memory 206 operatively coupled to the processing unit 204. The NFC unit 202 is configured to detect that an external transaction card (not shown) is in proximity of the mobile device 200. Furthermore, the processing unit 204 is configured to, in response to the detection of the transaction card: retrieve a digital representation of the transaction card from an external digitization server (not shown); load the digital representation of the transaction card into the memory 206; activate the digital representation of the transaction card for a predefined validity period; and invalidate the digital representation of the transaction card if no successful near field communication transaction has been performed within said validity period. For instance, such a near field communication transaction can be performed between the mobile device 200 and an external NFC reader (not shown), through the same NFC unit 202. The transaction to be performed can e.g. be an access to a building, an access to a public transportation site or vehicle, or a payment.

Figure 3:
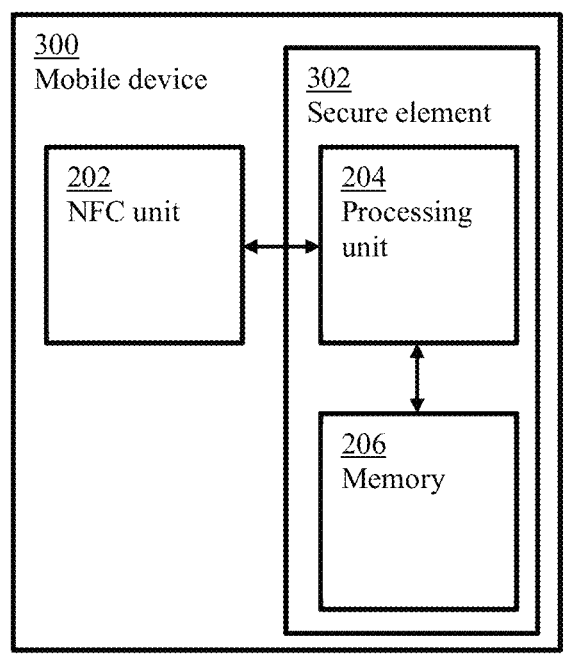
FIG. 3 shows another illustrative embodiment of a mobile device.

FIG. 3 shows another illustrative embodiment of a mobile device 300. In this embodiment, both the processing unit 204 and the memory 206 are included in a secure element 302 of the mobile device 300. As explained above, in this way, the level of security is increased.

Figure 4:
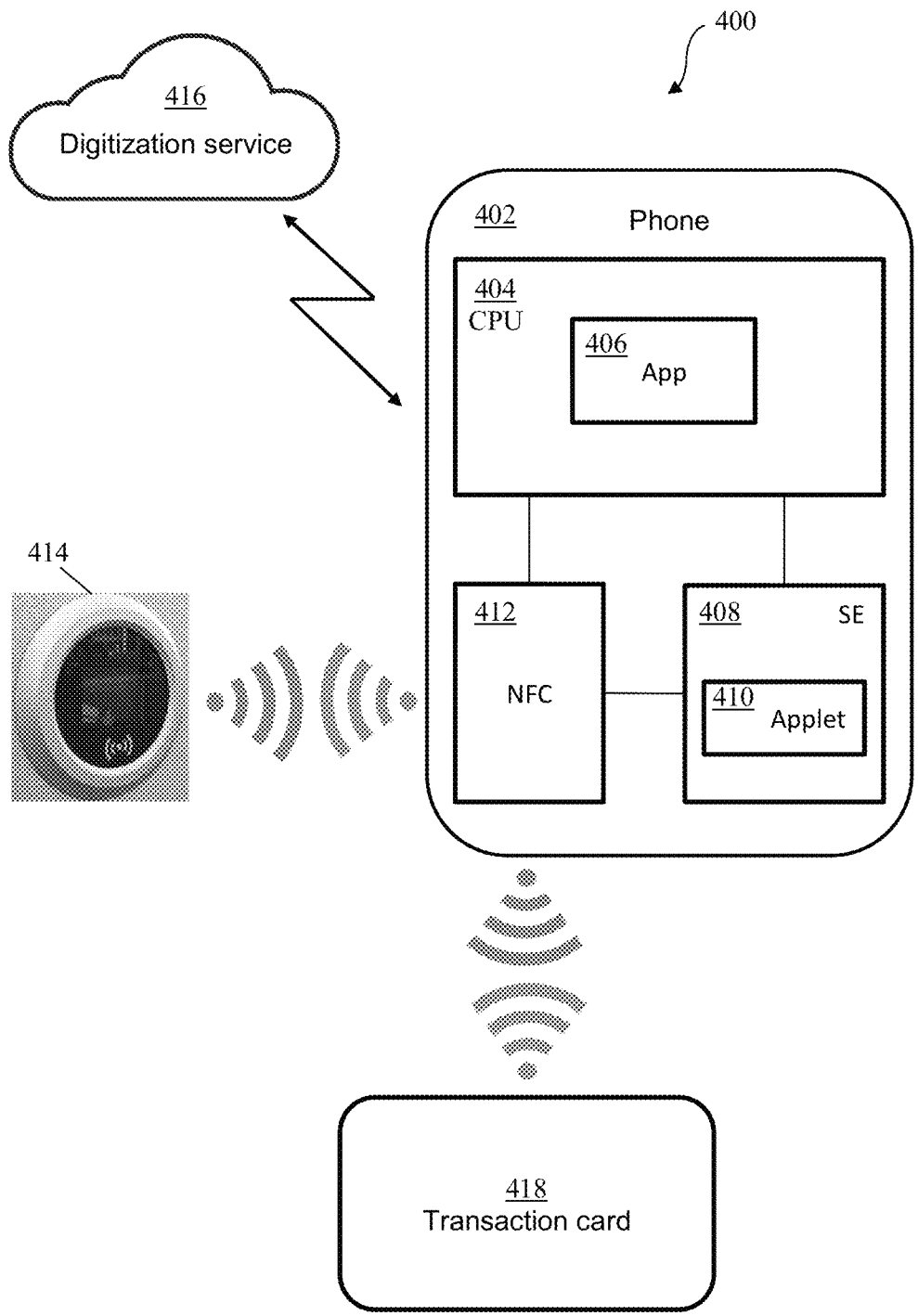
FIG. 4 shows an illustrative embodiment of a system for providing a digital representation of a transaction card in a mobile device.

FIG. 4 shows an illustrative embodiment of a system 400 for providing a digital representation of a transaction card 418 in a mobile device 402. In this example, the mobile device 402 is a mobile phone. The mobile device 402 includes a central processing unit (CPU) 404, a secure element (SE) 408, and an NFC unit 412. The mobile device 402 is configured to communicate with an external transaction card 418 and an external NFC reader 414 through the NFC unit 412. Furthermore, the mobile device 402 is configured to communicate with a digitization service 416, e.g. implemented in the cloud on a digitization server.

Furthermore, the CPU 404 contains an app 406, and is configured to execute said app 406, which communicates with the back-end (i.e., the digitization service 416) and the SE 408. The communication with the back-end may be carried out through a further communication unit (not shown) of the mobile device 402. The SE 408 contains an applet 410, and is configured to execute said applet 410, which runs for example an access control application (e.g. a MIFARE® application). The NFC unit 412 (also referred to as an NFC controller) is configured to communicate with the transaction card 418 and the NFC reader 414.

In this example, the following steps are performed to provide a digital representation of the transaction card 418 in the mobile device 402:

1. The app 406 is used to communicate to the digitization service 416, upon or after detection of the transaction card 418 by the NFC unit 412.

2. A secure channel is set up between digitization service 416 and the applet 410 of the SE 408.

3. A digital representation of the transaction card 418 is loaded into the applet 410.

4. The applet 410 initializes the digitized card, marks it as temporary and starts a timer that will count for a predefined validity period.

5a. If the timer expires, the applet 410 deletes the digitized card or marks it as invalid.

5b. If the applet 410 detects a valid NFC transaction with the digitized card before the timer expires, the timer is stopped, and the digitized card becomes a permanent one.

It is noted that, in alternative yet less secure implementation, the timer may run in the app 406 instead of in the SE applet 410. Furthermore, before performing step 3, the digitization service 416 can apply other, additional risk management features.

The systems and methods described herein may at least partially be embodied by a computer program—i.e., a software application or "application" in short—or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for providing a digital representation of a transaction card in a mobile device
102 detecting, by an NFC unit of a mobile device, that a transaction card is in proximity of the mobile device
104 upon or after said detecting, retrieving, by a processing unit of the mobile device, a digital representation of the transaction card from a digitization server
106 loading, by the processing unit, the digital representation of the transaction card into a memory of the mobile device
108 activating, by the processing unit, the digital representation of the transaction card for a predefined validity period
110 invalidating, by the processing unit, the digital representation of the transaction card if no successful NFC transaction has been performed within said validity period
200 mobile device
202 NFC unit
204 processing unit
206 memory
300 mobile device
302 secure element
400 system for providing a digital representation of a transaction card in a mobile device
402 mobile phone
404 central processing unit
406 app
408 secure element
410 applet
412 NFC unit
414 NFC reader
416 digitization service
418 transaction card

The invention claimed is:

1. A method for providing a digital representation of a transaction card in a mobile device, the method comprising:
  detecting, by a near field communication unit of said mobile device, that the transaction card is in proximity of the mobile device; upon or after said detecting, performing, by a processing unit of said mobile device, the following steps:
  retrieving the digital representation of the transaction card from a digitization server;
  loading the digital representation of the transaction card into a memory of the mobile device;
  activating the digital representation of the transaction card for a predefined validity period as a temporary card;
  detecting a successful near field communication transaction;
  validating the digital representation of the transaction card after a successful near field communication transaction has been performed within the predefined validity period;
  converting the temporary card into a permanent card after the validation; and invalidating the digital representation of the transaction card after no successful near field communication transaction has been performed within the predefined validity period.

2. The method of claim 1, wherein invalidating the digital representation of the transaction card further comprises:
deactivating the digital representation of the transaction card.

3. The method of claim 1, wherein invalidating the digital representation of the transaction card further comprises:
removing the digital representation of the transaction card from the memory.

4. The method of claim 1, wherein the digital representation includes data indicative of the predefined validity period.

5. The method of claim 1, wherein the transaction card is an access card.

6. The method of claim 1, wherein retrieving the digital representation of the transaction card from the digitization server is performed through a further communication unit of the mobile device.

7. The method of claim 6, wherein the further communication unit is a cellular communication unit or a Wi-Fi communication unit.

8. The method of claim 1, wherein the memory is included in a secure element of the mobile device.

9. The method of claim 8, wherein the processing unit is included in said secure element.

10. The method of claim 8, wherein the digital representation of the transaction card is retrieved through a secure channel established between the secure element and the digitization server.

11. A non-transitory computer-readable medium configured to be executed by a processor to perform a method for providing a digital representation of a transaction card in a mobile device, the non-transitory computer-readable medium comprising:
instructions for detecting, by a near field communication unit of the mobile device, that the transaction card is in proximity of the mobile device; upon or after said detecting, instructions for performing, by a processing unit of the mobile device, the following steps:
instructions for retrieving the digital representation of the transaction card from a digitization server;
instructions for loading the digital representation of the transaction card into a memory of the mobile device;
instructions for activating the digital representation of the transaction card for a predefined validity period as a temporary card;
instructions for detecting a successful near field communication transaction;
instructions for validating the digital representation of the transaction card after a successful near field communication transaction has been performed within the predefined validity period;
instructions for converting the temporary card into a permanent card after the validation; and
instructions for invalidating the digital representation of the transaction card after no successful near field communication transaction has been performed within the predefined validity period.

12. A mobile device, comprising a near field communication unit and a processing unit, wherein the near field communication unit is configured to detect that a transaction card is in proximity of the mobile device, and wherein the processing unit is configured to:
retrieve a digital representation of the transaction card from a digitization server;
load the digital representation of the transaction card into a memory of the mobile device;
activate the digital representation of the transaction card for a predefined validity period as a temporary card;
detecting a successful near field communication transaction;
validate the digital representation of the transaction card after a successful near field communication transaction has been performed within the predefined validity period;
convert the temporary card into a permanent card after the validation; and
invalidate the digital representation of the transaction card if no successful near field communication transaction has been performed within the predefined validity period.

13. The mobile device of claim 12, wherein the processing unit is configured to invalidate the digital representation of the transaction card by deactivating the digital representation of the transaction card.

14. The mobile device of claim 12, wherein the processing unit is configured to invalidate the digital representation of the transaction card by removing the digital representation of the transaction card from the memory.

15. The mobile device of claim 12, wherein the digital representation includes data indicative of the predefined validity period.

16. The mobile device of claim 12, wherein the processing unit is configured to retrieve the digital representation of the transaction card from the digitization server through a further communication unit of the mobile device.

17. The mobile device of claim 16 wherein the further communication unit is a cellular communication unit or a Wi-Fi communication unit.

18. The mobile device of claim 12, wherein the memory is included in a secure element of the mobile device.

19. The mobile device of claim 12, wherein the mobile device is a mobile phone.

* * * * *